US012500991B2

(12) United States Patent
Minoura

(10) Patent No.: US 12,500,991 B2
(45) Date of Patent: Dec. 16, 2025

(54) PLACEMENT METHOD

(71) Applicant: NEC Corporation, Tokyo (JP)

(72) Inventor: Kazuma Minoura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 671 days.

(21) Appl. No.: 17/907,823

(22) PCT Filed: Mar. 26, 2020

(86) PCT No.: PCT/JP2020/013811
§ 371 (c)(1),
(2) Date: Aug. 29, 2022

(87) PCT Pub. No.: WO2021/192183
PCT Pub. Date: Sep. 30, 2021

(65) Prior Publication Data
US 2023/0103768 A1 Apr. 6, 2023

(51) Int. Cl.
H04N 5/262 (2006.01)
G06T 7/11 (2017.01)
G06T 7/60 (2017.01)
G06T 7/70 (2017.01)
G06V 20/52 (2022.01)
G06V 40/10 (2022.01)

(52) U.S. Cl.
CPC ............ H04N 5/2628 (2013.01); G06T 7/11 (2017.01); G06T 7/60 (2013.01); G06T 7/70 (2017.01); G06V 20/53 (2022.01); G06V 40/10 (2022.01); G06T 2207/20021 (2013.01); G06T 2207/30196 (2013.01); G06T 2207/30242 (2013.01)

(58) Field of Classification Search
CPC .......... G06T 2207/20021; G06T 2207/30242; G06V 20/53
See application file for complete search history.

(56) References Cited

U.S. PATENT DOCUMENTS

| 11,157,747 | B2* | 10/2021 | Tsunematsu ............ G06T 7/73 |
| 12,094,127 | B2* | 9/2024 | Muta ...................... G06T 7/246 |
| 2015/0339519 | A1 | 11/2015 | Ueta et al. | |
| 2017/0053172 | A1* | 2/2017 | Nakasu ................. G06V 20/53 |
| 2018/0286068 | A1 | 10/2018 | Matsubara et al. | |
| 2019/0220673 | A1* | 7/2019 | Ikeda ..................... G06V 20/53 |
| 2021/0158555 | A1* | 5/2021 | Maeda .................. G06V 20/52 |

FOREIGN PATENT DOCUMENTS

| JP | 2015-222881 A | 12/2015 |
| JP | 2019-009752 A | 1/2019 |
| JP | 2019-071050 A | 5/2019 |
| WO | 2017/141454 A1 | 8/2017 |

OTHER PUBLICATIONS

International Search Report for PCT Application No. PCT/JP2020/013811, mailed on Aug. 11, 2020.

* cited by examiner

Primary Examiner — Boubacar Abdou Tchoussou
(74) Attorney, Agent, or Firm — Sughrue Mion, PLLC

(57) ABSTRACT

A placement apparatus according to the present invention includes: a detecting unit configured to detect a proportion of an existing person for each of division regions obtained by dividing a target region into a plurality of regions; a transforming unit configured to transform information representing the proportion of the person of each of the division regions into an array; and a determining unit configured to determine placement of the individual person in the division region based on the array.

17 Claims, 13 Drawing Sheets

PLACEMENT METHOD

This application is a National Stage Entry of PCT/JP2020/013811 filed on Mar. 26, 2020, the contents of all of which are incorporated herein by reference, in their entirety.

TECHNICAL FIELD

The present invention relates to a placement method for determining the placement of a person in a predetermined region, a placement apparatus, and a program.

BACKGROUND ART

In places visited by many people, such as a train station, an airport, a shopping mall and an event venue, a crowd is formed by the people. In such a place where a crowd is formed, it is required to grasp the status of congestion in order to consider measures such as ensuring safety and security. For example, a method described in Patent Document 1 is disclosed as a method for grasping the status of congestion by people.

In the method described in Patent Document 1, the status of congestion is analyzed from a moving image of a station and the like. Specifically, in Patent Document 1, the feature point of a person is extracted from the moving image, and the movement locus of the person is detected from the locus of the feature point. Moreover, in Patent Document 1, an icon indicating a person is placed on a background image in which no person is shown. Consequently, an image in which a person is shown is not displayed, and the privacy of a person whose image is to be captured is protected.

Patent Document 1: Japanese Translation of PCT International Application Publication WO2017/141454

However, in the method of Patent Document 1 described above, a placement method for placing the icon indicating the person on the background image is unknown. Therefore, it is unknown whether the icon can be placed so that the person actually exists on the background image in the image showing the status of congestion, and there is a fear that the placement of the person is unnatural as compared with the actual status. Thus, there is a problem that, when placing a person on an image representing a predetermined region, it is impossible to appropriately place the person in accordance with an actual status.

SUMMARY

Accordingly, an object of the present invention is to provide a placement method, a placement apparatus, and a program which can solve the abovementioned problem that, when placing a person on an image representing a predetermined region, it is impossible to appropriately place the person in accordance with an actual status.

A placement method as an aspect of the present invention includes: detecting a proportion of an existing person for each of division regions obtained by dividing a target region into a plurality of regions; transforming information representing the proportion of the person of each of the division regions into an array; and determining placement of the individual person in the division region based on the array.

Further, a placement apparatus as an aspect of the present invention includes: a detecting unit configured to detect a proportion of an existing person for each of division regions obtained by dividing a target region into a plurality of regions; a transforming unit configured to transform information representing the proportion of the person of each of the division regions into an array; and a determining unit configured to determine placement of the individual person in the division region based on the array.

Further, a program as an aspect of the present invention includes instructions for causing an information processing apparatus to realize: a detecting unit configured to detect a proportion of an existing person for each of division regions obtained by dividing a target region into a plurality of regions; a transforming unit configured to transform information representing the proportion of the person of each of the division regions into an array; and a determining unit configured to determine placement of the individual person in the division region based on the array.

With the configurations as described above, the present invention makes it possible to, when placing a person on an image representing a predetermined region, appropriately place a person in accordance with an actual status.

EXAMPLE EMBODIMENTS

First Example Embodiment

Figure 1:
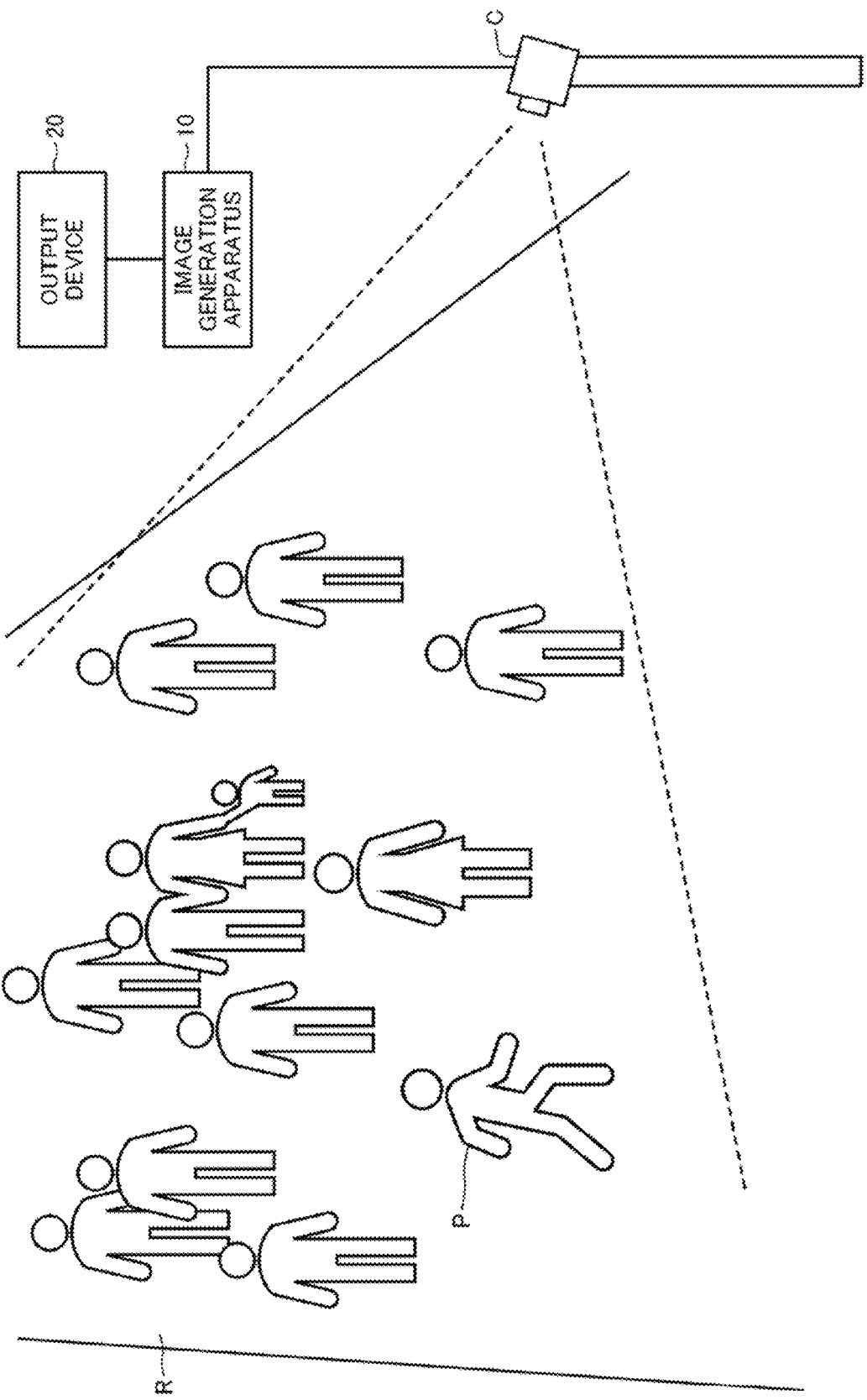
FIG. 1 is a view showing an overall configuration of an information processing system in a first example embodiment of the present invention.
Figure 2:
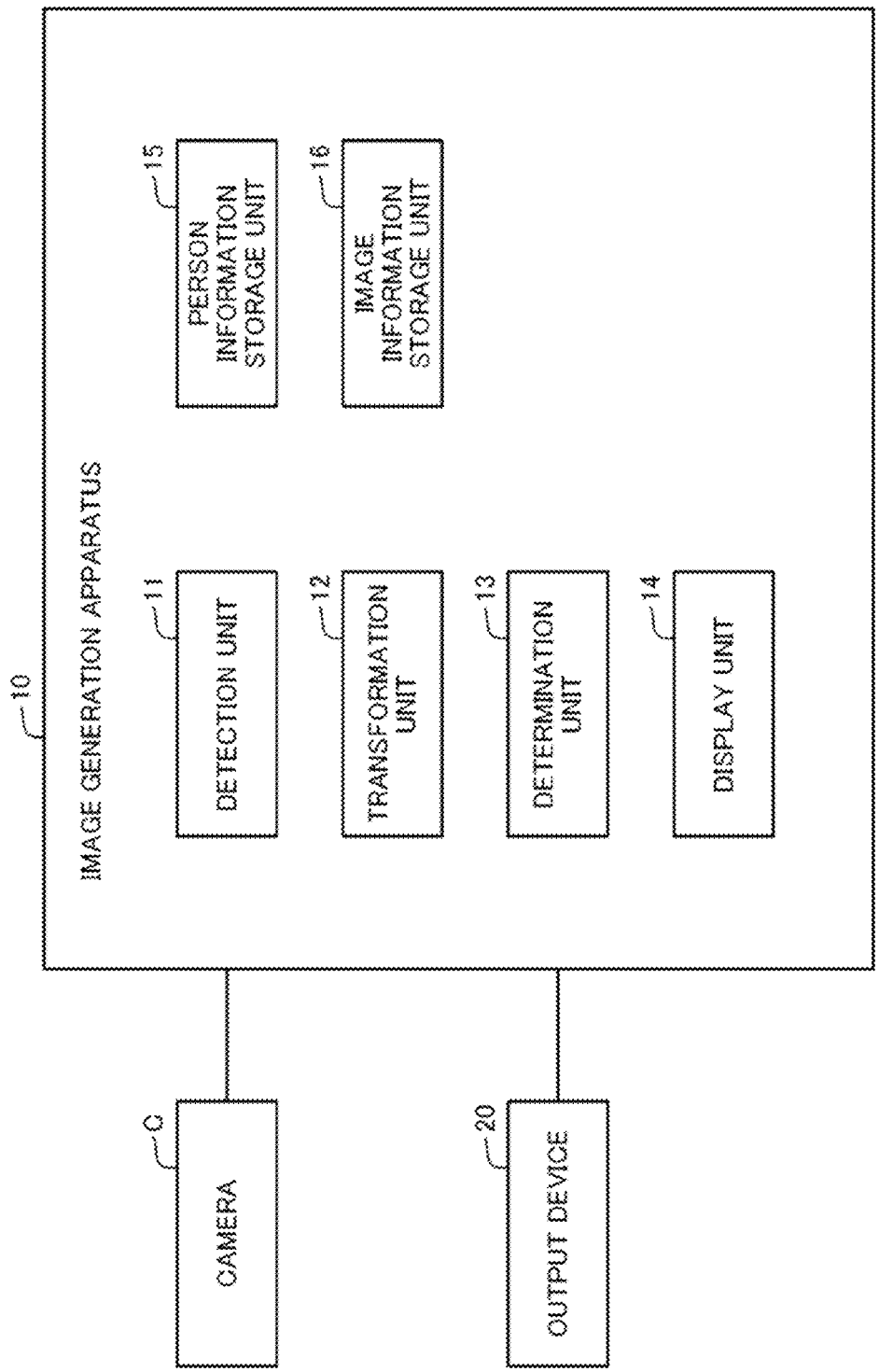
FIG. 2 is a block diagram showing a configuration of an image generation apparatus in the first example embodiment of the present invention.

A first example embodiment of the present invention will be described with reference to FIGS. 1 to 10. FIGS. 1 to 2 are views for describing a configuration of an information processing system, and FIGS. 3 to 10 are views for describing a processing operation of the information processing system.

[Configuration]

The information processing system according to the present invention detects a person P who exists in a target region R set indoors or outdoors, and generates a crowd image in which a person image corresponding to the person P is placed. The target region R is a place visited by many people, such as a station, an airport, a shopping mall, and an event venue. Therefore, the information processing system generates a crowd image in order to grasp the status of congestion of people in the target region R. In particular, the information processing system of this example embodiment protects the privacy of the person P by placing an abstracted person image corresponding to the person P on a background image in which no person is shown and generating a crowd image. Meanwhile, the target region R is not limited to the abovementioned place, and may be any place.

As shown in FIG. 1, the information processing system in this example embodiment includes a camera C for capturing an image of the target region R, an image generation apparatus 10 generating a crowd image, and an output device 20 outputting the generated crowd image to display.

The camera C is for capturing a region image that is an image of the target region R, and is installed so as to capture an image of the target region R from diagonally above. For example, as will be described later, the camera C is placed so that its shooting direction forms a predetermined angle θ with respect to the horizontal plane. Then, the camera C captures an image of the target region R at any timing such as a preset time, and transmits the image as a region image to the image generation apparatus 10.

The output device 20 includes, for example, a display device such as a display. The output device 20 outputs a crowd image generated by the image generation apparatus 10 as will be described later to display in accordance with a display instruction from the image generation apparatus 10. Meanwhile, the output device 20 is not necessarily limited to a display device, and may be a device that outputs a crowd image by any output method, such as a printing device that prints out a crowd image.

The image generation apparatus 10 (placement apparatus) is configured by one or a plurality of information processing apparatuses including an arithmetic logic unit and a storage unit. Then, the image generation apparatus 10 includes a detection unit 11, a transformation unit 12, a determination unit 13, and a display unit 14 as shown in FIG. 2. The functions of the detection unit 11, the transformation unit 12, the determination unit 13 and the display unit 14 can be realized by execution of a program for realizing the respective functions stored in the storage unit by the arithmetic logic unit. The image generation apparatus 10 also includes a person information storage unit 15 and an image information storage unit 16. The person information storage unit 15 and the image information storage unit 16 are configured by the storage unit. Below, the respective components will be described in detail.

The detection unit 11 (detecting unit) first accepts a region image of the target region R captured by the camera C. At the time, the detection unit 11 stores a region image captured when the person P does not exist as a background image into the image information storage unit 16, for example. Meanwhile, the background image stored into the image information storage unit 16 is not necessarily limited to a region image of the target region R actually captured by the camera C, and may be an image generated by computer graphics and the like.

Figure 3:
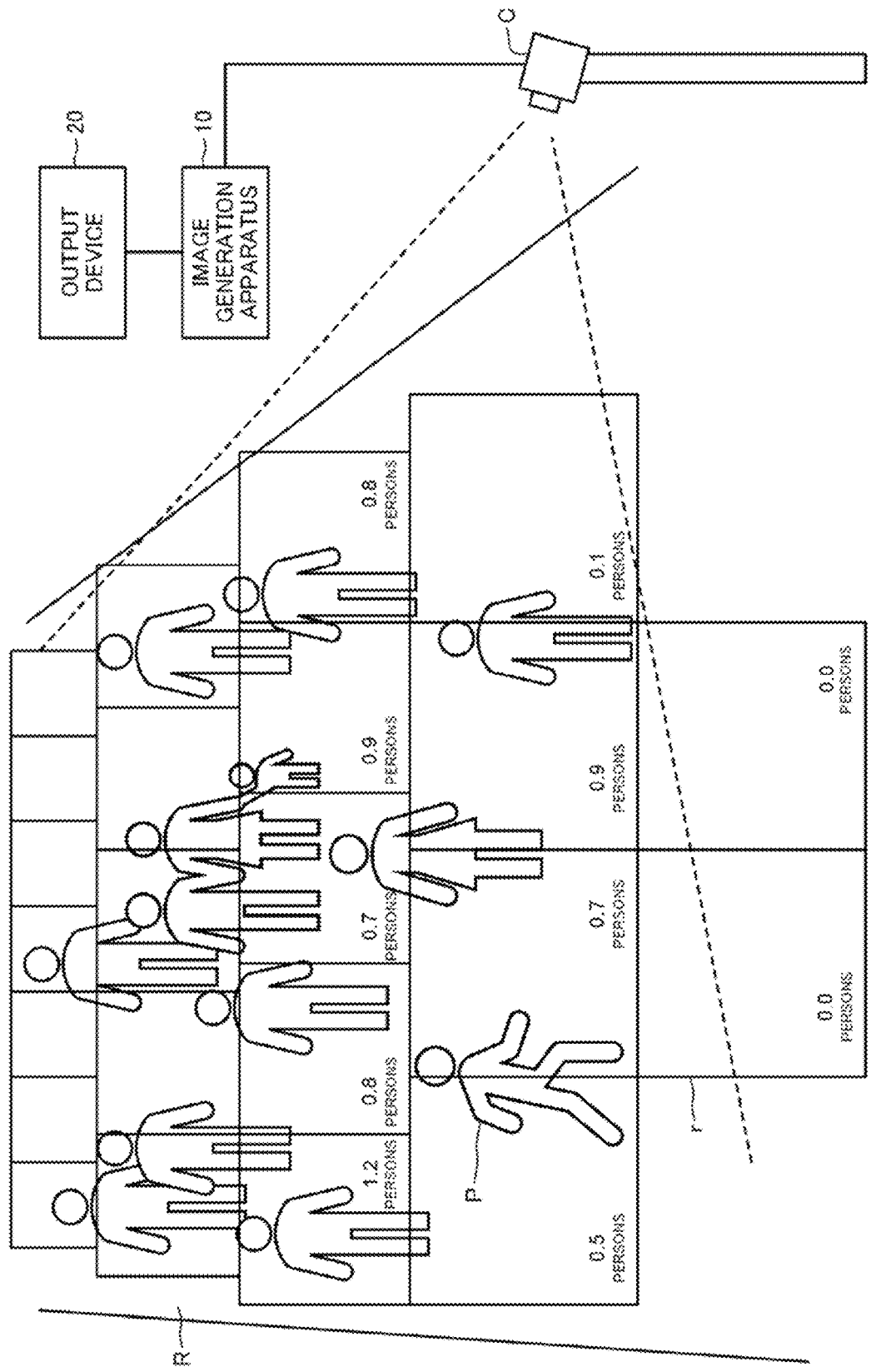
FIG. 3 is a view showing processing by the image generation apparatus disclosed in FIG. 1.

Further, the detection unit 11 performs a process of detecting the person P from a region image in which the person P exists in the target region R. Specifically, as shown in FIG. 3, the detection unit 11 first sets a plurality of division regions r obtained by dividing the target region R on the region image into a plurality of regions in the height direction and the horizontal direction. At the time, the detection unit 11 sets the division regions r located on the front side on the region image wide and sets the division regions r located on the back side narrow in consideration of the perspective of the region image. Thus, the detection unit 11 sets a plurality of division regions r indicated by solid rectangles on the target region R that is a shooting range of the camera C as shown by dotted line in FIG. 4.

Then, the detection unit 11 detects, for each of the division regions r, the proportion of a person existing in the division region r. At the time, the detection unit 11 detects the proportion of the person P existing in the division region r based on the proportion of the entire body of the person P shown in the division region r. That is to say, by detecting the proportion of the person P existing in the division region r to a single person, the detection unit 11 detects the number of the person P existing in the division region r by a decimal number. Specifically, the detection unit 11 first detects the entire body of the person P existing in the target image. As an example, the entire body of the person P is discriminated based on the shape and color of an object shown in the target image, but may be detected by any method. Then, the detection unit 11 examines at what proportion the detected entire body of the single person P is shown in each of the division regions r, and detects the proportion as the proportion of the person P existing in the division region r. In the example of FIG. 3, the detection unit 11 detects 0.0 persons in the respective division regions r located in the forefront with respect to the camera C, detects 0.5 persons, 0.7 persons, 0.9 persons and 0.1 persons in the division regions r located in the back, and detects 1.2 persons, 0.8 persons, 0.7 persons, 0.9 persons and 0.8 persons in the division regions r located in the further back. Meanwhile, the method of detecting the proportion of the person P in each of the division regions r by the detection unit 11 is not limited to the abovementioned method.

At the time of detecting the person P as described above, the detection unit 11 detects the height, that is, the body height of the person P. At the time, the detection unit 11 detects the body height of the person P in consideration of the position in the perspective direction of the person P with respect to the camera C in accordance with the position where the person P is detected in the target image. Then, the body height of the person P is stored in association with the division region r in which the person P is detected. Moreover, the detection unit 11 may detect the attribute such as gender and age of the person P, and stores the attribute in association with the division region r in which the person P is detected. For example, the detection unit 11 detects the attribute of the person P based on the body height, the positional relation between the feature points of the face, and the like, of the person P.

The transformation unit 12 (transforming unit) transforms information of the number representing the proportion of the person P in each of the division regions r detected as described above into an array. Specifically, as shown in the upper view of FIG. 5, the transformation unit 12 transforms the number representing the proportion of the person P in each of the division regions r into a proportion figure, which is a rectangular figure having a dimension set according to the number, and then generates an array in which the proportion figures are placed and connected in line. That is to say, the transformation unit 12 transforms the number representing the proportion of the person P in each of the division regions r into a rectangular proportion figure having a longer horizontal length as the value is larger, and generates an array by connecting the proportion figures in line in the horizontal direction. For example, in the example shown in the upper view of FIG. 5, the first proportion figure from the left side is represented as a rectangle having a length corresponding to 0.6 persons, and the second proportion figure from the left side is represented as a rectangle having a length corresponding to 0.5 persons.

The determination unit 13 (determining unit) determines the placement of the individual persons P in the division regions r based on the array generated as described above. That is to say, the determination unit 13 determines in which division region r each of the persons P is located. Specifically, the determination unit 13 generates, from the array shown in the upper view of FIG. 5, an individual person figure array obtained by separating the proportion figures connected in line in the array into individual person figures each corresponding to the dimension of a single person in the horizontal direction as shown in the middle view of FIG. 5. That is to say, by sequentially separating into individual person figures each having a length for a single person regardless of the division region r, the determination unit 13 generates an individual person figure array in which the individual person figures are placed in line in the horizontal direction.

Figure 5:
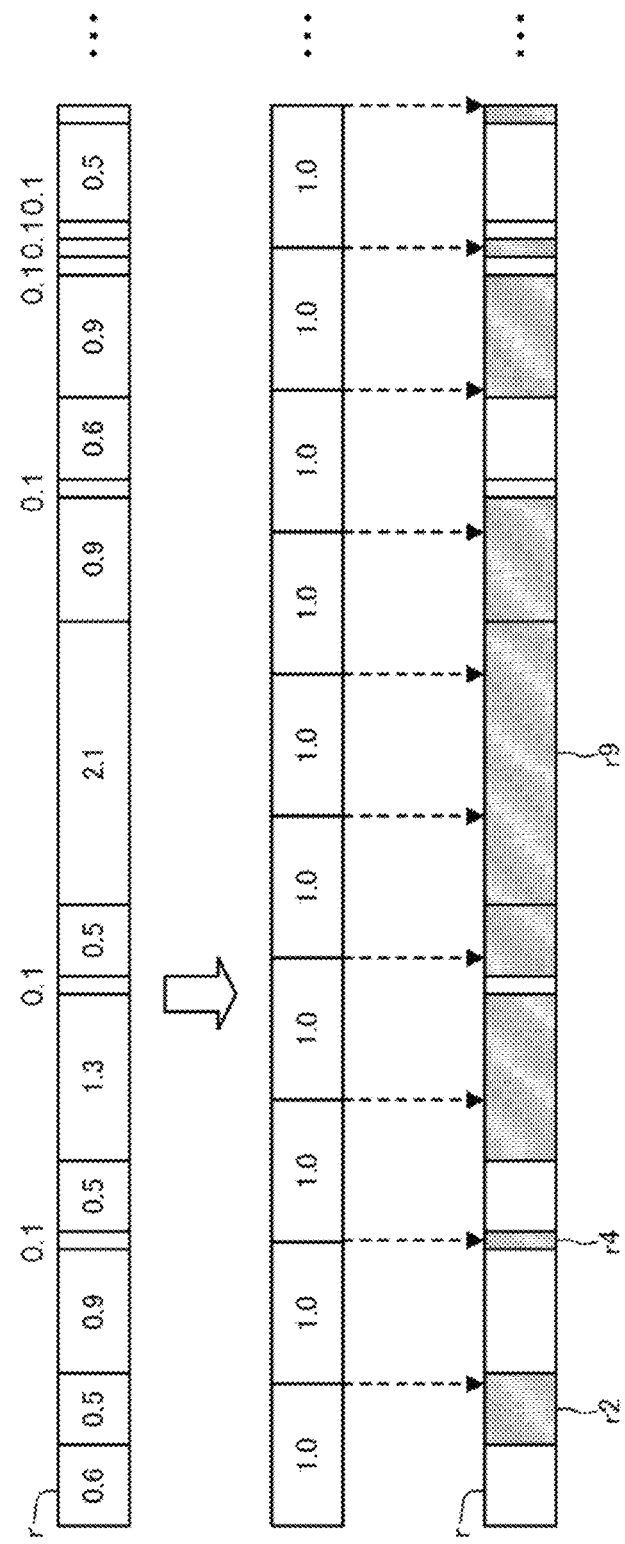
FIG. 5 is a view showing processing by the image generation apparatus disclosed in FIG. 1.

Then, the determination unit 13 determines the placement of each person P in the division region r based on the array shown in the upper view of FIG. 5 and the individual person figure array shown in the middle view of FIG. 5. At the time, the determination unit 13 examines to which proportion figure the separation position between the individual person figures separated for each person in the individual person figure array shown in the middle view of FIG. 5 corresponds in the array shown in the lower view of FIG. 5. Then, the determination unit 13 specifies a proportion figure in an array shown by hatching in the lower view of FIG. 5 corresponding to the separation position between the individual person figures in the individual person figure array, and determines to place each person P in the division region r corresponding to the specified proportion figure.

Consequently, in the example of FIG. 5, the determination unit 13 determines to place a single person P in each of a division region r2 corresponding to a proportion figure of 0.5 persons that is the second one from the left of the array, a division region r4 corresponding to a proportion figure of 0.1 persons that is the fourth one from the left, and the like. The determination unit 13 determines to place two persons in a division region r9 corresponding to a proportion figure of 2.1 persons that is the ninth one from the left of the array in the example of FIG. 5.

Figure 6:
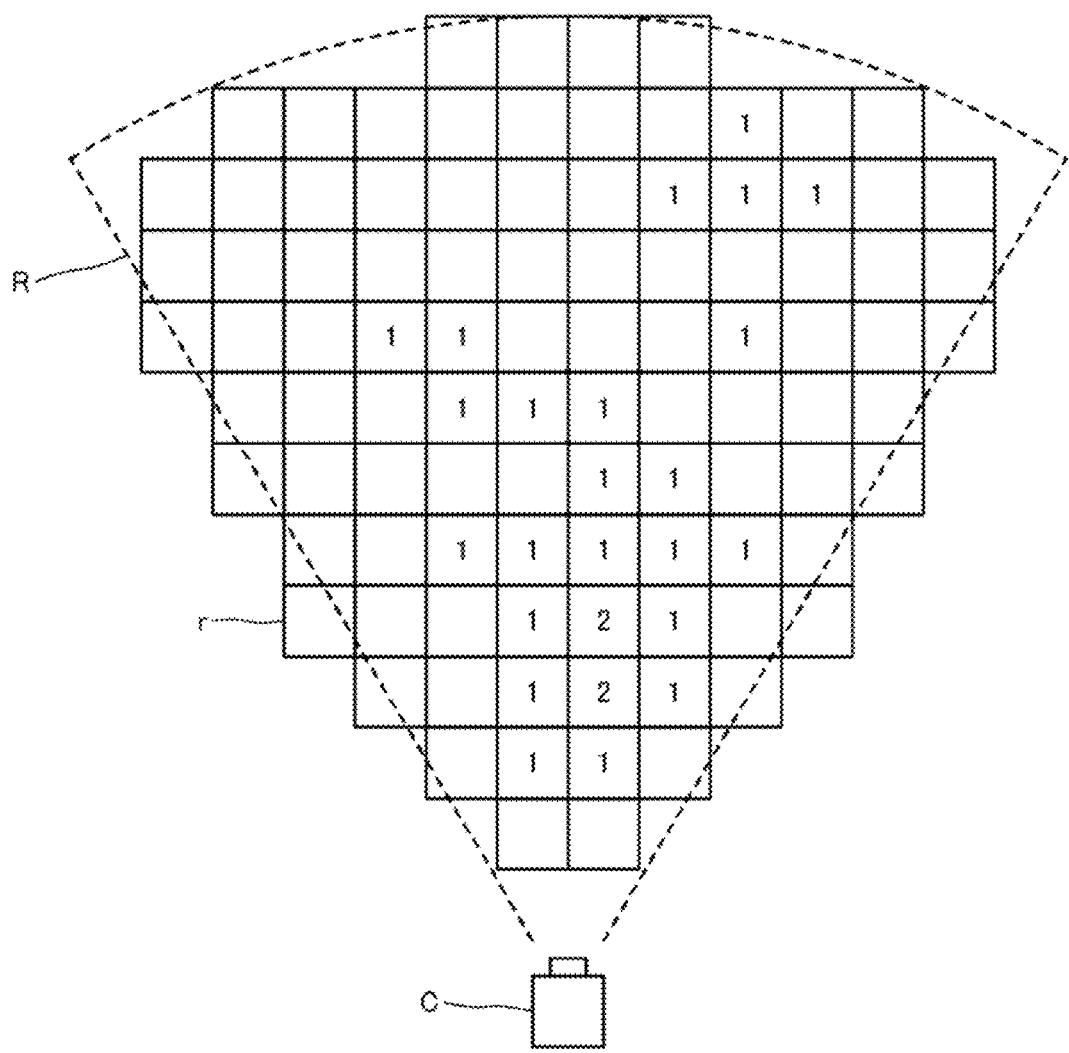
FIG. 6 is a view showing processing by the image generation apparatus disclosed in FIG. 1.

Thus, the determination unit 13 determines the number of persons P to be placed in each of all the division regions r. For example, the determination unit 13 stores the number of persons P in association with a position corresponding to each of all the division regions in the target region R as shown in FIG. 6. The determination unit 13 further determines a detailed position in the division region r of the person P determined to be located in the division region r at random and stores.

The method of determining the placement of the persons P in the division regions r by the determination unit 13 described above is an example, and the placement may be determined by another method. For example, the determination unit 13 may specify a proportion figure in the array corresponding to any position of an individual person figure in the individual person figure array shown in the middle view of FIG. 5, and determine to place each person P in a division region r corresponding to the specified proportion figure. As an example, in FIG. 5, any positions of the first individual person figure from the left side of the individual person figure array correspond to two proportion figures that are the first and second ones from the left side of the array. In this case, the determination unit 13 specifies only one of the two proportion figures, and determines to place a single person P in a division region r corresponding to the specified proportion figure. In a case where three or more proportion figures correspond to one individual person figure, the determination unit 13 specifies only one of them and determines to place a single person P in a division region r corresponding to the specified proportion figure.

Figure 7:
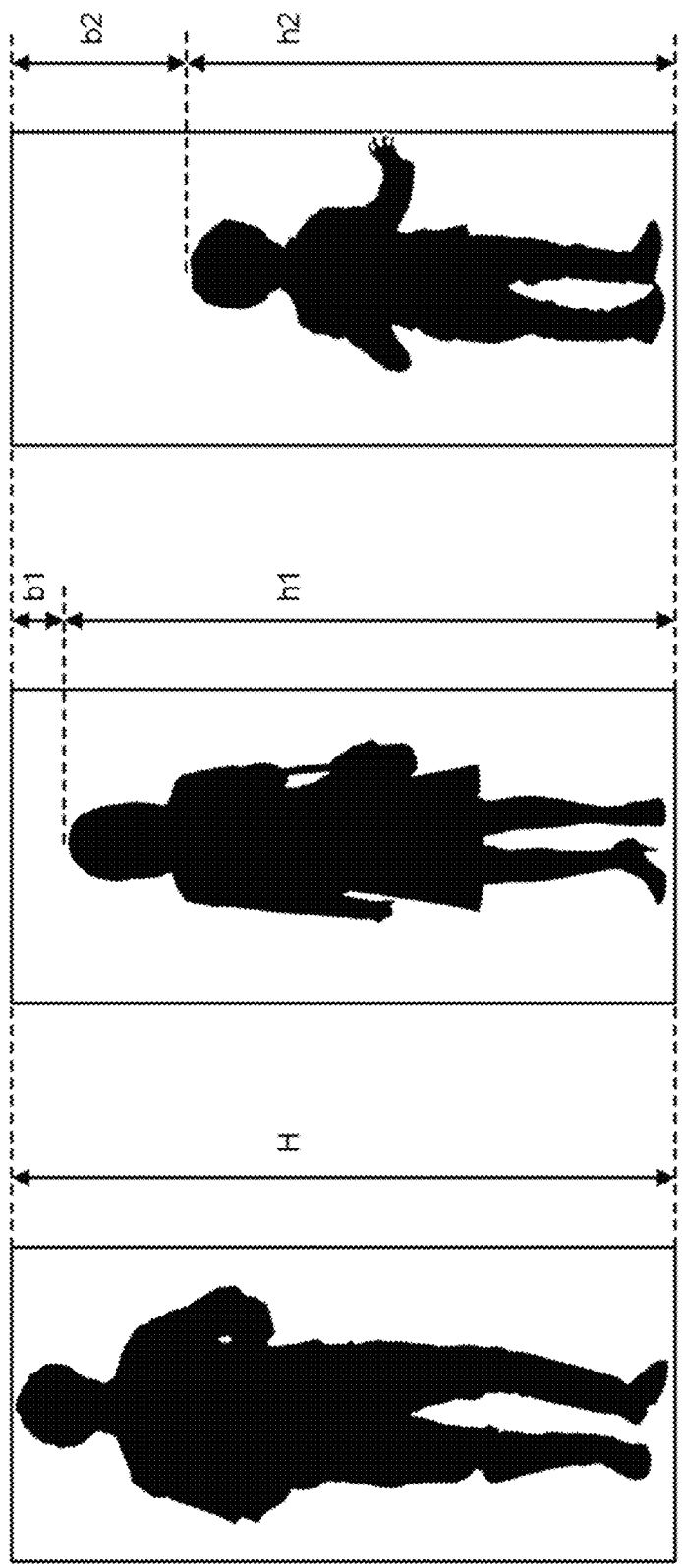
FIG. 7 is a view showing processing by the image generation apparatus disclosed in FIG. 1.

The display unit 14 (displaying unit) generates a crowd image in which a person image corresponding to the person P is placed on a background image corresponding to the target region R stored in the image information storage unit 16, and outputs the crowd image to display on the output device 20. The person image to be placed on the background image is prepared and stored in the image information storage unit 16 in advance. For example, a plurality of person images are prepared and, as shown in FIG. 7, three types including man, woman and child from the left are prepared. Therefore, the display unit 14 selects a person image of a type that corresponds to the attribute (gender, age) of the person P associated with the division region r, and places the person image on the background image.

The three types of person images are formed so that the heights of the images are the same and the heights of person portions drawn in the images are different. Specifically, as shown in FIG. 7, all the person images are formed to have a height denoted by symbol H, whereas the heights of the persons drawn in the person images are different; man has a height H almost the same as that of the person image, woman has a height h1 lower than the height H of the person image, and child has a height h2 lower than the height H. That is to say, the heights H of the person images are standardized by leaving blanks b1 and b2 above the height h1 of the woman portion and the height h2 of the child portion, respectively.

Figure 8:
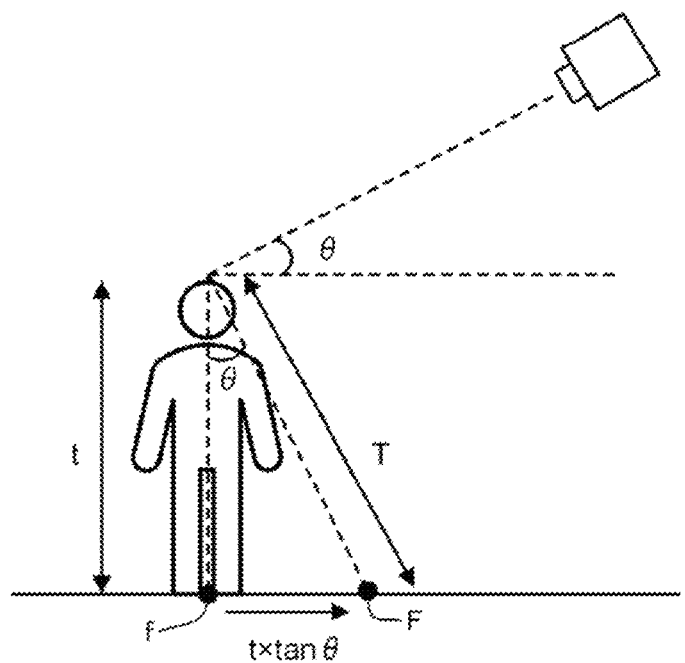
FIG. 8 is a view showing processing by the image generation apparatus disclosed in FIG. 1.

Then, the display unit 14 corrects the body height of the person P associated with the division region r and the position in the division region r in accordance with a shooting angle that is the condition of shooting by the camera C, and places the person image on the background image. For example, as shown in FIG. 8, it is assumed that the camera C is placed so that a shooting direction thereof forms a predetermined angle θ with respect to the horizontal plane. In this case, using a body height t of the detected person P and the angle θ, (t×tan θ) is set as a correction value for the position in the division region r of the person P. Thus, the display unit 14 corrects a position f of the person P to a position denoted by symbol F of FIG. 8. Also, the display unit 14 corrects the body height t of the person P so that a distance from the position F after correction of the person to the top of the head becomes a body height T.

Figure 9:
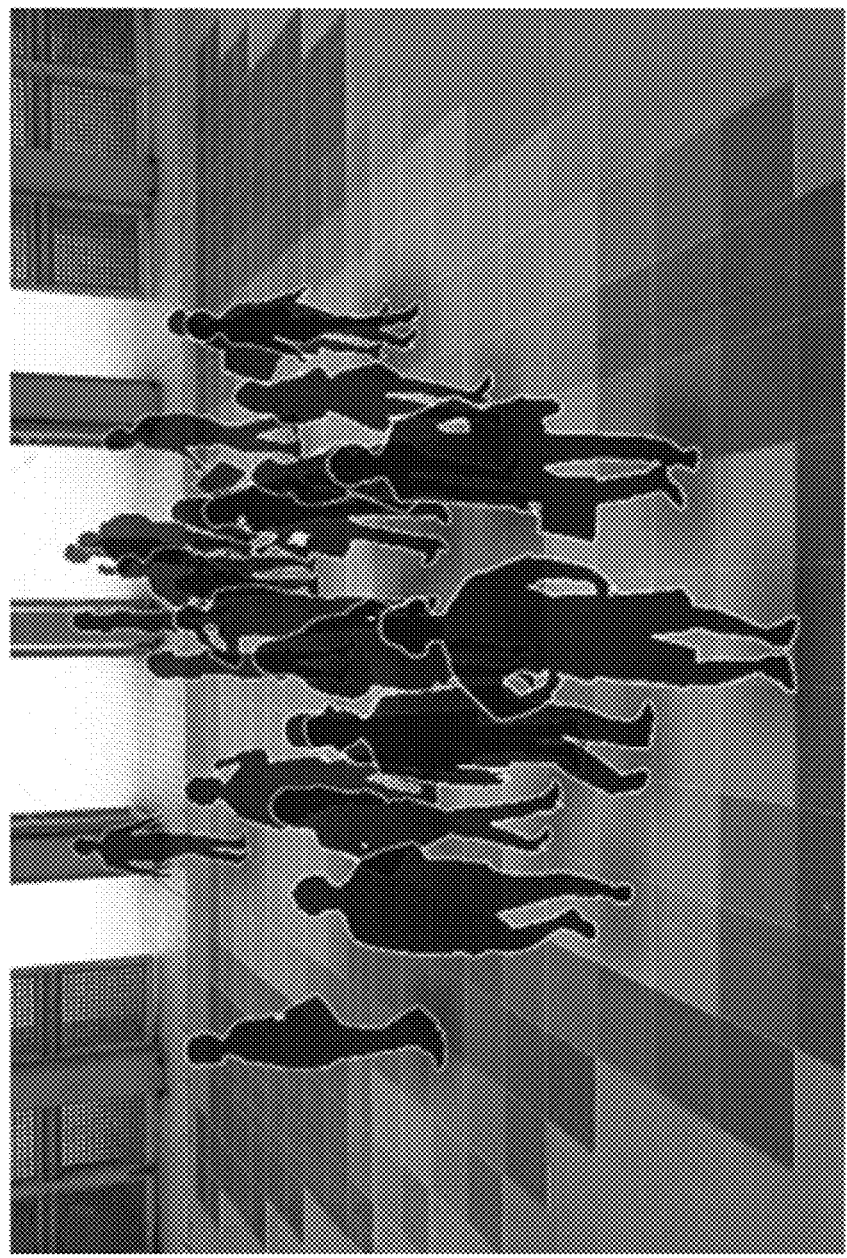
FIG. 9 is a view showing processing by the image generation apparatus disclosed in FIG. 1.

Thus, as shown in FIG. 9, the display unit 14 generates the crowd image in which the person image corresponding to the person P is placed on the background image corresponding to the target region R, and outputs the crowd image to display on the output device 20. Specifically, the display unit 14 places the person image at the position F after correction as described above in each of the division regions r, and also places the person image after enlarging or reducing the person image so that the person portion of the person image becomes a height corresponding to the body height H after corrected as described above.

The display unit 14 executes processing as described below, for example, at the time of placing person images on the background image to generate a crowd image. For example, the display unit 14 may draw the border between the person portion and the background in white and draw the person portions of the person images in a plurality of colors. Moreover, the display unit 14 can make a natural image so that the shaggy is not conspicuous by performing antialiasing between the person images and the background image. When the same antialiasing is performed on the front side and the back side of the background image, the border of the person image on the back side disappears. However, by multiplying the drawing color by a count and correcting in accordance with the distance from the camera C to the placement position of the person image, the reduction ratio of the person image, and others, the display unit 14 can make a natural image.

Further, the display unit 14 may perform processing as described below in order to express a sense of perspective in the crowd image. For example, the display unit 14 may gradually increase the transparency of the person images from the front side to the back side of the background image. By changing the transparency, it is possible to obtain an effect similar to the aerial perspective method in which the color becomes lighter as it is farther. A transmission coefficient to be multiplied by the pixel value for the change in transparency may be changed linearly in accordance with the distance from the camera C to the person image, the dimension of the person image, and others, and may be changed non-linearly by using an imaging function or the like.

Further, the display unit 14 may set the drawing color of each pixel as shown below at the time of superimposing and displaying the person images. For example, given a person image with a depth of 8 bits, assuming a pixel value (0 to 255) is s, a body color to be drawn is $C_b$, a border color is $C_e$ and an antialiasing correction coefficient is $t_a$ for each pixel, a drawing color $C_i$ in a certain pixel of the person image is determined by the following Equation 1.

$$C_i = C_b \times (1.0 - (s \div 255) \times t_a) + C_e \times (s \div 255) \times t_a \quad \text{[Equation 1]}$$

Further, assuming the transparency (0 to 255) of a certain pixel of the person image is α, a transmission coefficient for expressing a sense of perspective is tb, and the pixel value of the background image is $C_s$, a new pixel value $C_d$ after the drawing color $C_i$ of the person image is superimposed is determined by the following Equation 2.

$$C_d = C_s \times (1.0 - (\alpha \div 255) \times t_b) + C_i \times ((\alpha \div 255) \times t_b) \quad \text{[Equation 2]}$$

Further, in order to express a three-dimensional appearance, the display unit 14 may draw a person image to be drawn at a position farther from the camera in order of distance, or may draw an elliptical shadow on the ground and superimpose a person image on the shadow. Moreover, the display unit 14 may draw a tile-shaped crowd density map as a heat map at the foot of a person image. Moreover, not limited to the crowd density, the display unit 14 may superimpose the numerical values of the magnitude of movement, direction of movement, proportions of gender and age, and the like, of the crowd as map information.

[Operation]

Figure 10:
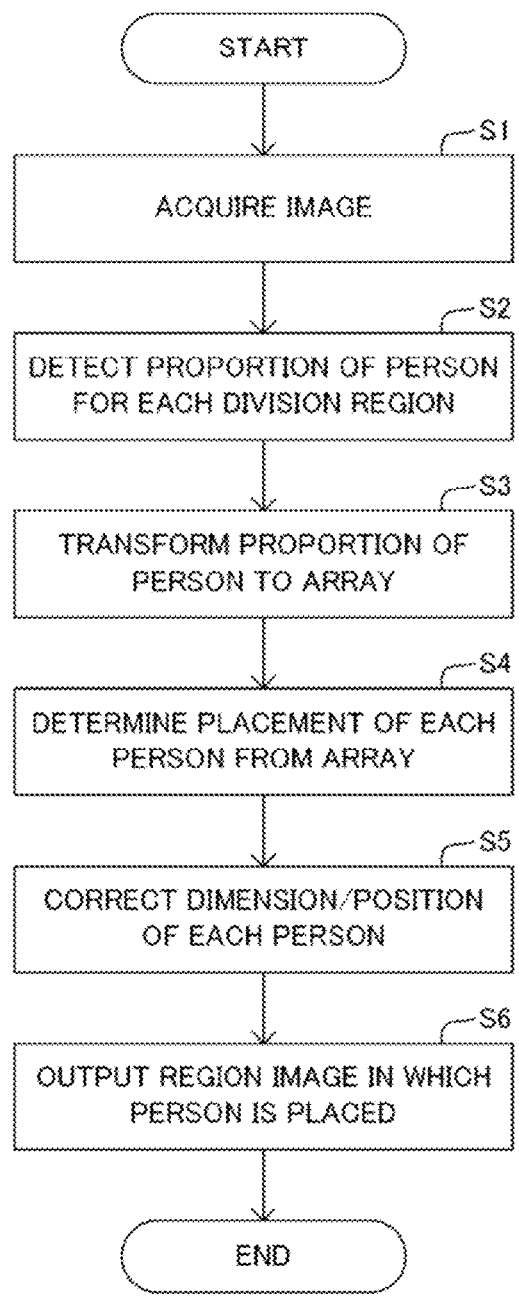
FIG. 10 is a flowchart showing a processing operation by the image generation apparatus disclosed in FIG. 1.

Next, an operation of the above information processing system, specifically, an operation of the image generation apparatus 10 will be described mainly with reference to a flowchart of FIG. 10. The image generation apparatus 10 accepts a region image of a target region R captured by the camera C. First, the image generation apparatus 10 stores a region image captured when no person P exists as a background image in advance.

Figure 4:
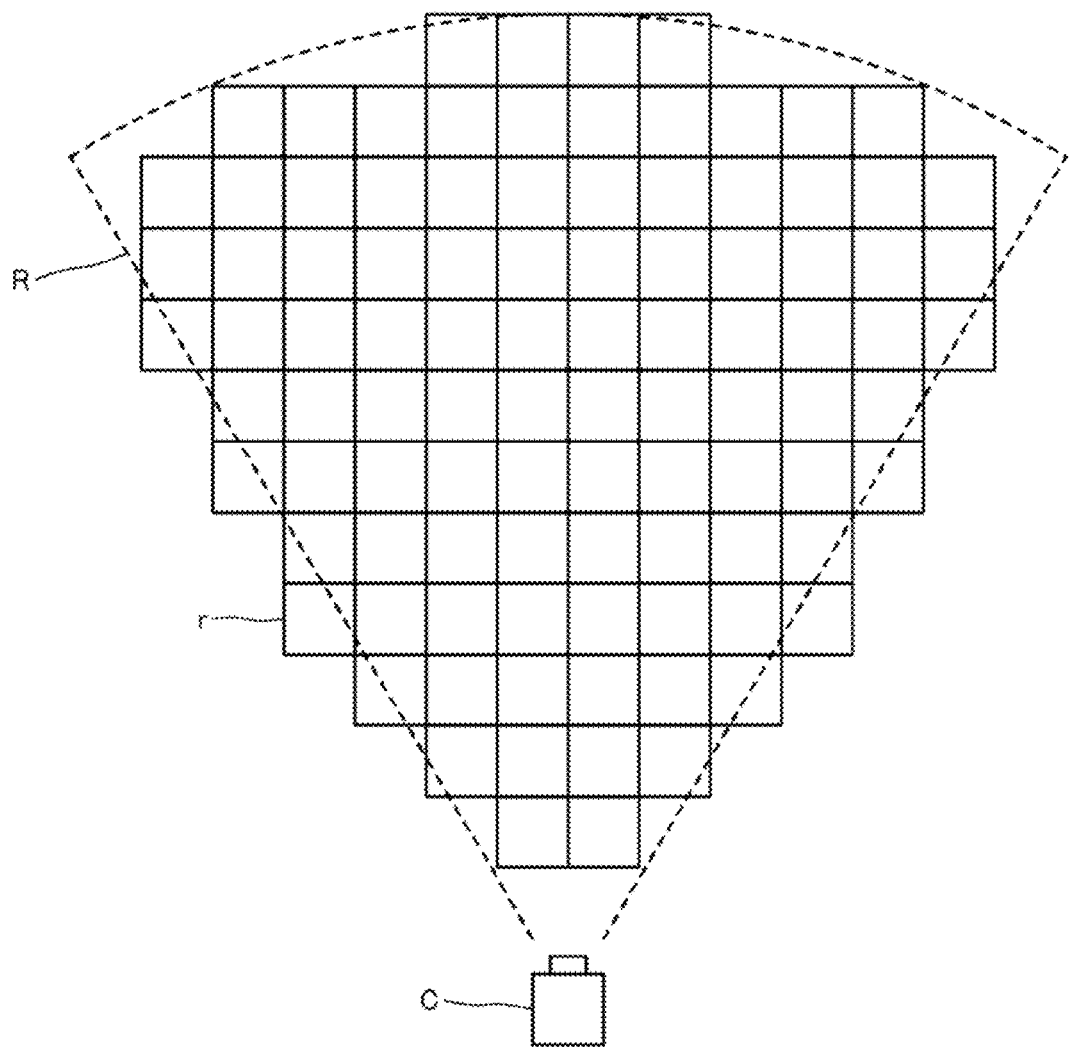
FIG. 4 is a view showing processing by the image generation apparatus disclosed in FIG. 1.

After that, upon accepting a region image of the target region R captured by the camera C (step S1), the image generation apparatus 10 performs a process of detecting a person P from the region image. At the time, as shown in FIGS. 3 and 4, the image generation apparatus 10 sets a plurality of division regions r obtained by dividing the target region R on the region image into a plurality of regions in the height direction and the horizontal direction, and detects the proportion of an existing person P for each of the division regions r (step S2). For example, as shown in FIG. 3, by detecting the proportion of an existing person P to a single person for each of the division regions r, the image generation apparatus 10 detects the number of the person P existing in the division region r as a decimal.

Subsequently, the image generation apparatus 10 transforms information of the number representing the proportion of the person Pin each of the division regions r into an array (step S3). For example, as shown in the upper view of FIG. 5, the image generation apparatus 10 transforms the number representing the proportion of the person P in each of the division regions r into a proportion figure that is a rectangular figure having a dimension set according to the number, and then generates an array in which the proportion figures are placed and connected in line. Then, the image generation apparatus 10 determines the placement of the individual persons P in the division regions r based on the generated array (step S4). For example, the image generation apparatus 10 generates, from the array shown in the upper view of FIG. 5, an individual person figure array by separating the proportion figures connected in line in the array into individual person figures each corresponding to the dimension of a single person in the horizontal direction as shown in the middle view of FIG. 5. Then, the image generation apparatus 10 determines the placement of each person P in each division region r based on the array shown in the upper view of FIG. 5 and the individual person figure array shown in the middle view of FIG. 5. As an example, the image generation apparatus 10 examines which proportion figure in the array shown in the lower view of FIG. 5 an individual person figure separation position separating into the individual persons P in the individual person figure array shown in the middle view of FIG. 5 corresponds to. Then, as shown by arrow from the middle view to the lower view of FIG. 5 and by hatching in the lower view of FIG. 5, the image generation apparatus 10 specifies a proportion figure in the array corresponding to the individual person figure separation position in the individual person figure array, and determines to place each person P into a division region r corresponding to the specified proportion figure.

Thus, the image generation apparatus 10 determines the number of persons P to be placed for each of all the division regions r. For example, as shown in FIG. 6, the image generation apparatus 10 stores the determined number of persons P in association with a position corresponding to each of all the division regions r in the target region R. The image generation apparatus 10 further determines a detailed position in the division region r of the person P determined to be located in the division region r at random and stores.

Subsequently, before generating a crowd image in which a person image corresponding to the person P is placed on the stored background image corresponding to the target region R, the image generation apparatus 10 corrects the placement position and dimension of the person image (step S5). For example, the image generation apparatus 10 corrects the body height of the person P associated with the division region r and the position in the division region r in accordance with a shooting angle that is the condition of shooting by the camera C. Then, the image generation apparatus 10 generates a crowd image in which the person image is placed after conversion of the position and dimension of the person image in accordance with the corrected information, and outputs the crowd image to display on the output device 20 (step S6).

Thus, according to this example embodiment, first, the proportion of an existing person is detected for each of division regions obtained by dividing a target region, the proportions of the persons are transformed into an array, and the placement of the individual persons in the division regions is determined based on the array. Consequently, it is possible to place the persons in appropriate positions corresponding to the actual status of the target region, and it is possible to generate a natural crowd image.

Although the proportion of an existing person for each of the division regions r obtained by dividing the target region R is detected from an image obtained by shooting the target region R with the camera C, the proportion of an existing person for each of the division regions r is not necessarily limited to being detected from an image. For example, the proportion of an existing person for each of the division regions r may be detected by using a detection device such as an infrared sensor installed so as to measure the space above the target region R, or a detection device such as a pressure sensor installed on the ground in the target region R.

Second Example Embodiment

Figure 11:
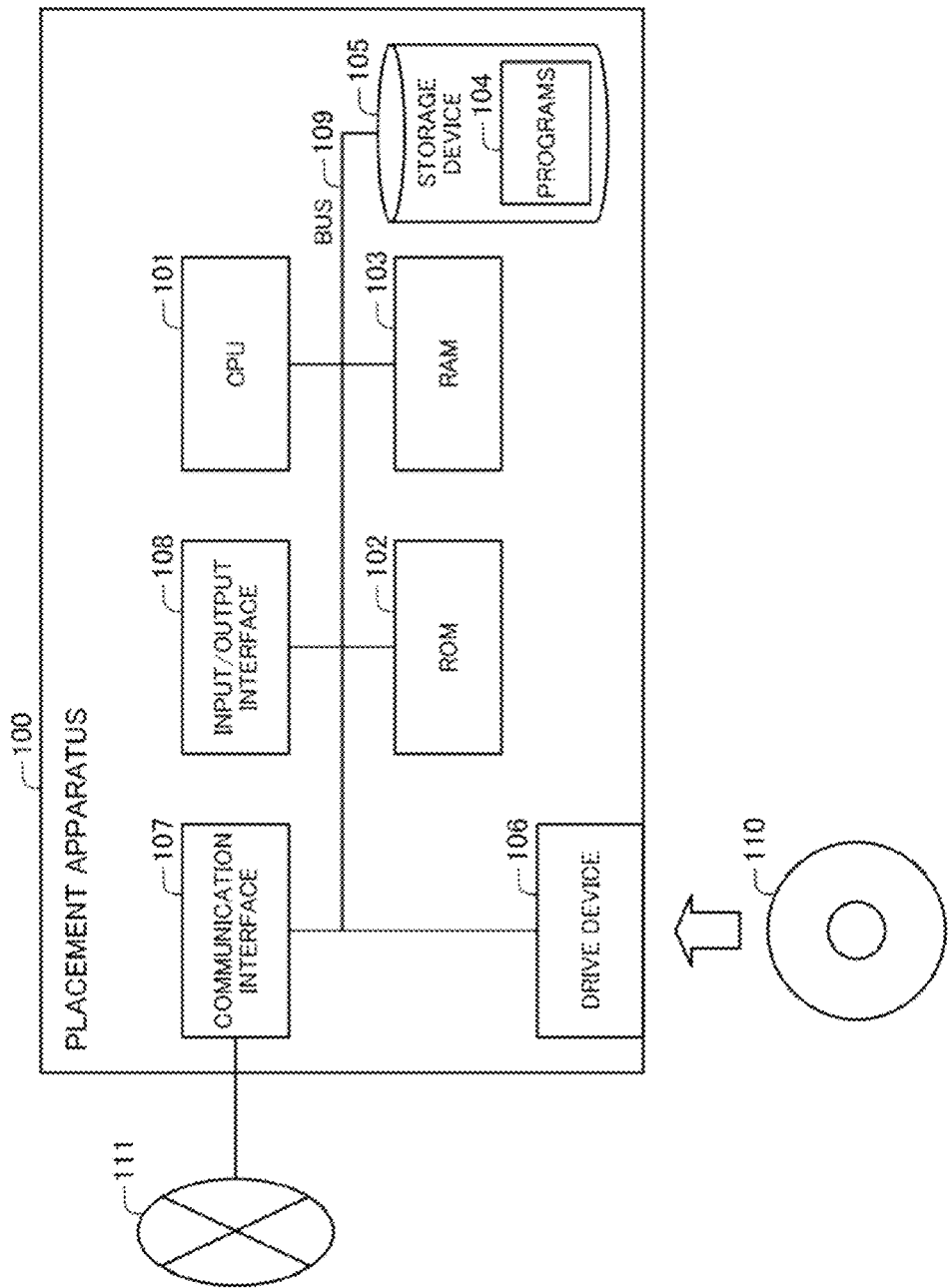
FIG. 11 is a block diagram showing a hardware configuration of a placement apparatus in the first example embodiment of the present invention.
Figure 12:
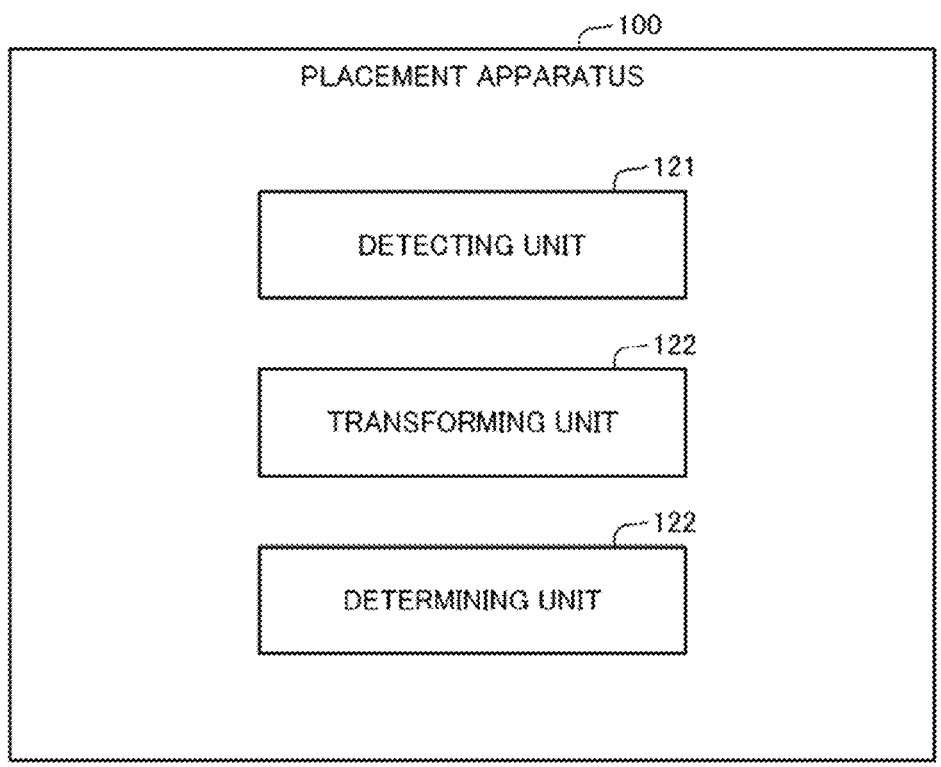
FIG. 12 is a block diagram showing a configuration of a placement apparatus in a second example embodiment of the present invention.
Figure 13:
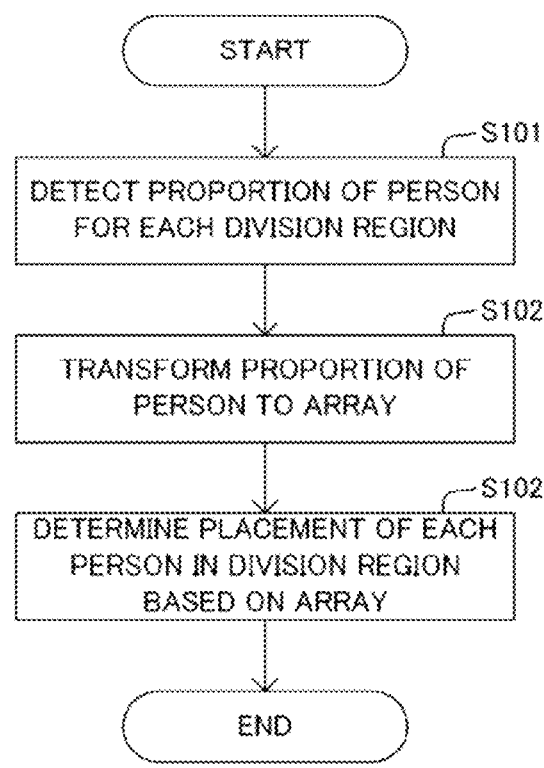
FIG. 13 is a flowchart showing an operation of the placement apparatus in the second example embodiment of the present invention.

Next, a second example embodiment of the present invention will be described with reference to FIGS. 11 to 13. FIGS. 11 to 12 are block diagrams showing a configuration of a placement apparatus in the second example embodiment, and FIG. 13 is a flowchart showing an operation of the placement apparatus. In this example embodiment, the overview of the configurations of the placement apparatus and the placement method described in the above example embodiment will be shown.

With reference to FIG. 11, a hardware configuration of a placement apparatus 100 in this example embodiment will be described. The placement apparatus 100 is configured by a general-purpose information processing apparatus and, as an example, has the following hardware configuration including;
  a CPU (Central Processing Unit) 101 (arithmetic logic unit),
  a ROM (Read Only Memory) 102 (storage unit),
  a RAM (Random Access Memory) 103 (storage unit),
  programs 104 loaded to the RAM 103,
  a storage device 105 for storing the programs 104,
  a drive device 106 reading from and writing into a storage medium 110 outside the information processing apparatus,
  a communication interface 107 connected to a communication network 111 outside the information processing apparatus,
  an input/output interface 108 inputting and outputting data, and
  a bus 109 connecting the respective components.

Then, the placement apparatus 100 can structure and include a detecting unit 121, a transforming unit 122 and a determining unit 123 shown in FIG. 12 by acquisition and execution of the programs 104 by the CPU 101. For example, the programs 104 are stored in the storage device 105 and the ROM 102 in advance, and loaded to the RAM 103 and executed by the CPU 101 as necessary. The programs 104 may be supplied to the CPU 101 via the communication network 111, or may be stored in the storage medium 110 in advance and retrieved and supplied to the CPU 101 by the drive device 106. However, the detecting unit 121, the transforming unit 122 and the determining unit 123 described above may be structured by a dedicated electronic circuit for realizing the units.

FIG. 11 shows an example of the hardware configuration of the information processing apparatus serving as the placement apparatus 100, and the hardware configuration of the information processing apparatus is not limited to the abovementioned case. For example, the information processing apparatus may be configured by part of the above configuration, for example, excluding the drive device 106.

Then, the placement apparatus 100 executes the placement method shown in the flowchart of FIG. 13 by the functions of the detecting unit 121, the transforming unit 122 and the determining unit 123 structured by the programs as described above.

As shown in FIG. 13, the placement apparatus 100 executes a process of:
  detecting the proportion of an existing person for each of division regions obtained by dividing a target region into a plurality of regions (step S101);
  transforming information representing the proportion of the person of each of the division regions into an array (step S102); and
  determining the placement of each person in the division region based on the array.

According to the present invention, with the configuration as described above, first, the proportion of an existing person is detected for each of the division regions obtained by dividing the target region, the proportions of the persons are transformed into an array, and the placement of each person in the division region is determined based on the array. Therefore, it is possible to place a person in an appropriate position corresponding to the actual status of a target region.

The abovementioned programs can be stored by using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). Moreover, the programs may be supplied to a computer by various types of transitory computer-readable mediums. Examples of the transitory computer-readable mediums include an electric signal, an optical signal, and an electromagnetic wave. The transitory computer-readable mediums can supply the programs to a computer via a wired communication path such as an electric wire and an optical fiber or via a wireless communication path.

Although the present invention has been described above with reference to the example embodiments and the like, the present invention is not limited to the example embodiments. The configurations and details of the present invention can be changed in various manners that can be understood by one skilled in the art within the scope of the present invention. Moreover, at least one or more functions of the functions of the detecting unit 121, the transforming unit 122, and the determining unit 123 may be executed by an information processing apparatus installed and connected in any place on the network, that is, may be executed by so-called cloud computing.

<Supplementary Notes>

The whole or part of the example embodiments disclosed above can be described as the following supplementary notes. Below, the overview of the configurations of a placement method, a placement apparatus, and a program according to the present invention will be described. However, the present invention is not limited to the following configurations.

(Supplementary Note 1)

A placement method comprising:
 detecting a proportion of an existing person for each of division regions obtained by dividing a target region into a plurality of regions;
 transforming information representing the proportion of the person of each of the division regions into an array; and
 determining placement of the individual person in the division region based on the array.

(Supplementary Note 2)

The placement method according to Supplementary Note 1, comprising:
 transforming the information representing the proportion of the person of each of the division regions into a proportion figure having a dimension set according to the proportion, and also transforming into the array in which the proportion figures are connected in line and placed; and
 generating, from the array, an individual person figure array in which the proportion figures connected in the array are separated into individual person figures having a dimension set according to the individual person, and determining placement of the individual person in the division region based on the individual person figure array.

(Supplementary Note 3)

The placement method according to Supplementary Note 2, comprising
 determining placement of the individual person in the division region based on a position of the individual person figure in the individual person figure array and a position of the proportion figure in the array.

(Supplementary Note 4)

The placement method according to Supplementary Note 3, comprising
 determining to place the person in the division region corresponding to the proportion figure in the array located corresponding to the position of the individual person figure in the individual person figure array.

(Supplementary Note 5)

The placement method according to Supplementary Note 4, comprising
 in a case where there are a plurality of proportion figures in the array located corresponding to the position of the individual person figure in the individual person figure array, determining to place the person in the division region corresponding to one of the plurality of proportion figures.

(Supplementary Note 6)

The placement method according to any of Supplementary Notes 1 to 5, comprising
 based on the determined placement of the individual person, displaying a person image that is an image representing the person on a region image that is an image corresponding to the target region.

(Supplementary Note 7)

The placement method according to Supplementary Note 6, comprising
 detecting the proportion of the existing person for each of the division regions by capturing an image of the target region with an image capture device; and
 in accordance with a condition of shooting by the image capture device, correcting a dimension and/or a display position of the person image and displaying the person image on the region image.

(Supplementary Note 8)

The placement method according to Supplementary Note 6 or 7, comprising
 displaying a plurality of types of person images having been prepared on the region image.

(Supplementary Note 9)

The placement method according to Supplementary Note 8, wherein
 the plurality of types of person images are formed so that dimensions in a height direction of the images are same and heights of person portions drawn in the images are different.

(Supplementary Note 10)

A placement apparatus comprising:
 a detecting unit configured to detect a proportion of an existing person for each of division regions obtained by dividing a target region into a plurality of regions;
 a transforming unit configured to transform information representing the proportion of the person of each of the division regions into an array; and
 a determining unit configured to determine placement of the individual person in the division region based on the array.

(Supplementary Note 11)

The placement apparatus according to Supplementary Note 10, wherein:
 the transforming unit is configured to transform the information representing the proportion of the person of each of the division regions into a proportion figure having a dimension set according to the proportion, and also transform into the array in which the proportion figures are connected in line and placed; and
 the determining unit is configured to generate, from the array, an individual person figure array in which the proportion figures connected in the array are separated into individual person figures having a dimension set according to the individual person, and determine placement of the individual person in the division region based on the individual person figure array.

(Supplementary Note 12)

The placement apparatus according to Supplementary Note 11, wherein
 the determining unit is configured to determine placement of the individual person in the division region based on a position of the individual person figure in the individual person figure array and a position of the proportion figure in the array.

(Supplementary Note 13)

The placement apparatus according to Supplementary Note 12, wherein
 the determining unit is configured to determine to place the person in the division region corresponding to the proportion figure in the array located corresponding to the position of the individual person figure in the individual person figure array.

(Supplementary Note 14)

The placement apparatus according to Supplementary Note 13, wherein the determining unit is configured to, in a case where there are a plurality of proportion figures in the array located corresponding to the position of the individual person figure in the individual person figure array, determine to place the person in the division region corresponding to one of the plurality of proportion figures.

(Supplementary Note 15)

The placement apparatus according to any of Supplementary Notes 10 to 14, comprising a displaying unit configured to, based on the determined placement of the individual person, display a person image that is an image representing the person on a region image that is an image corresponding to the target region.

(Supplementary Note 16)

The placement apparatus according to Supplementary Note 15, wherein the detecting unit is configured to detect the proportion of the existing person for each of the division regions by capturing an image of the target region with an image capture device; and the displaying unit is configured to, in accordance with a condition of shooting by the image capture device, correct a dimension and/or a display position of the person image and display the person image on the region image.

(Supplementary Note 17)

The placement apparatus according to Supplementary Note 15 or 16, wherein the displaying unit is configured to display a plurality of types of person images having been prepared on the region image.

(Supplementary Note 18)

A non-transitory computer-readable storage medium having a program stored therein, the program comprising instructions for causing an information processing apparatus to realize:

a detecting unit configured to detect a proportion of an existing person for each of division regions obtained by dividing a target region into a plurality of regions;

a transforming unit configured to transform information representing the proportion of the person of each of the division regions into an array; and a determining unit configured to determine placement of the individual person in the division region based on the array.

(Supplementary Note 19)

The non-transitory computer-readable storage medium having the program stored therein according to Supplementary Note 18, the program comprising instructions for causing the information processing apparatus to further realize:

a displaying unit configured to, based on the determined placement of the individual person, display a person image that is an image representing the person on a region image that is an image corresponding to the target region.

DESCRIPTION OF NUMERALS 10 image generation apparatus
11 detection unit
12 transformation unit
13 determination unit
14 display unit
15 person information storage unit
16 image information storage unit
20 output device
C camera
P person
R target region
r division region
100 placement apparatus
101 CPU
102 ROM
103 RAM
104 programs
105 storage device
106 drive device
107 communication interface
108 input/output interface
109 bus
110 storage medium
111 communication network
121 detecting unit
122 transforming unit
123 determining unit

What is claimed is:

1. A placement method comprising:

detecting a proportion of an existing person for each of division regions obtained by dividing a target region into a plurality of regions;

transforming information representing the proportion of the person of each of the division regions into an array;

determining placement of the individual person in the division region based on the array;

transforming the information representing the proportion of the person of each of the division regions into a proportion figure having a dimension set according to the proportion, and also transforming into the array in which the proportion figures are connected in line and placed; and generating, from the array, an individual person figure array in which the proportion figures connected in the array are separated into individual person figures having a dimension set according to the individual person, and determining placement of the individual person in the division region based on the individual person figure array.

2. The placement method according to claim 1, comprising determining placement of the individual person in the division region based on a position of the individual person figure in the individual person figure array and a position of the proportion figure in the array.

3. The placement method according to claim 2, comprising determining to place the person in the division region corresponding to the proportion figure in the array located corresponding to the position of the individual person figure in the individual person figure array.

4. The placement method according to claim 3, comprising in a case where there are a plurality of proportion figures in the array located corresponding to the position of the individual person figure in the individual person figure array, determining to place the person in the division region corresponding to one of the plurality of proportion figures.

5. The placement method according to claim 1, comprising
based on the determined placement of the individual person, displaying a person image that is an image representing the person on a region image that is an image corresponding to the target region.

6. The placement method according to claim 5, comprising
detecting the proportion of the existing person for each of the division regions by capturing an image of the target region with an image capture device; and
in accordance with a condition of shooting by the image capture device, correcting a dimension and/or a display position of the person image and displaying the person image on the region image.

7. The placement method according to claim 5, comprising
displaying a plurality of types of person images having been prepared on the region image.

8. The placement method according to claim 7, wherein the plurality of types of person images are formed so that dimensions in a height direction of the images are same and heights of person portions drawn in the images are different.

9. A placement apparatus comprising:
at least one memory configured to store instructions; and
at least one processor configured to execute the instructions to:
detect a proportion of an existing person for each of division regions obtained by dividing a target region into a plurality of regions;
transform information representing the proportion of the person of each of the division regions into an array;
determine placement of the individual person in the division region based on the array;
transform the information representing the proportion of the person of each of the division regions into a proportion figure having a dimension set according to the proportion, and also transform into the array in which the proportion figures are connected in line and placed; and
generate, from the array, an individual person figure array in which the proportion figures connected in the array are separated into individual person figures having a dimension set according to the individual person, and determine placement of the individual person in the division region based on the individual person figure array.

10. The placement apparatus according to claim 9, wherein the at least one processor is configured to execute the instructions to
determine placement of the individual person in the division region based on a position of the individual person figure in the individual person figure array and a position of the proportion figure in the array.

11. The placement apparatus according to claim 10, wherein the at least one processor is configured to execute the instructions to
determine to place the person in the division region corresponding to the proportion figure in the array located corresponding to the position of the individual person figure in the individual person figure array.

12. The placement apparatus according to claim 11, wherein the at least one processor is configured to execute the instructions to
in a case where there are a plurality of proportion figures in the array located corresponding to the position of the individual person figure in the individual person figure array, determine to place the person in the division region corresponding to one of the plurality of proportion figures.

13. The placement apparatus according to claim 9, wherein the at least one processor is configured to execute the instructions to
based on the determined placement of the individual person, display a person image that is an image representing the person on a region image that is an image corresponding to the target region.

14. The placement apparatus according to claim 13, wherein the at least one processor is configured to execute the instructions to
detect the proportion of the existing person for each of the division regions by capturing an image of the target region with an image capture device; and
in accordance with a condition of shooting by the image capture device, correct a dimension and/or a display position of the person image and display the person image on the region image.

15. The placement apparatus according to claim 13 wherein the at least one processor is configured to execute the instructions to
display a plurality of types of person images having been prepared on the region image.

16. A non-transitory computer-readable storage medium having a program stored therein, the program comprising instructions for causing an information processing apparatus to execute processes to:
detect a proportion of an existing person for each of division regions obtained by dividing a target region into a plurality of regions;
transform information representing the proportion of the person of each of the division regions into an array;
determine placement of the individual person in the division region based on the array;
transform the information representing the proportion of the person of each of the division regions into a proportion figure having a dimension set according to the proportion, and also transform into the array in which the proportion figures are connected in line and placed; and
generate, from the array, an individual person figure array in which the proportion figures connected in the array are separated into individual person figures having a dimension set according to the individual person, and determine placement of the individual person in the division region based on the individual person figure array.

17. The non-transitory computer-readable storage medium having the program stored therein according to claim 16, the program comprising instructions for causing the information processing apparatus to further execute the processes to:
based on the determined placement of the individual person, display a person image that is an image representing the person on a region image that is an image corresponding to the target region.

* * * * *